United States Patent Office 3,294,697
Patented Dec. 27, 1966

3,294,697
STABLE SOLUTIONS FOR POLYURETHANE FOAMS
Wesley L. Le Fevre, Lake Jackson, Tex., assignor to The Dow Chemical Company, Midland, Mich., a corporation of Delaware
No Drawing. Filed Feb. 5, 1964, Ser. No. 342,788
12 Claims. (Cl. 252—188.3)

This invention relates to the stabilization of polyol solutions which are used in the manufacture of polyurethane foams. More particularly the invention concerns the use of organic nitro compounds to retard the discoloration and increase in viscosity of polyols containing the polymerization catalyst and foaming agent prior to the time the polyols are mixed with the diisocyanate to produce the foam.

It is common practice in the manufacture of polyurethane foams to combine several of the ingredients prior to the final mixing which results in the foaming and polymerization. The prior mixing reduces the number of separate components which must be metered and mixed to provide a foaming mixture having a uniform composition. The foaming materials usually are marketed as two separate solutions, one containing the diisocyanate and a cell control agent and the other containing the polyol, a foaming agent and a polymerization catalyst. The foam manufacturer need only to combine the proper proportions of these two solutions in a mixer to produce the foamed resin.

A problem which sometimes arises in the preparation of foams from these pre-mixed solutions is that the polyol solution containing the foaming agent and catalyst becomes discolored and increases in viscosity if it is not used soon after it has been prepared or if it is subjected to relatively high temperatures. The discoloration may be undesirable in the foamed product. The increased viscosity presents problems in the mixing of the reactants as well as the development of the foam.

I have found that the polyol solutions can be stabilized against these undesirable changes by the addition of a small amount of an aliphatic or aromatic nitro compound. Suitable nitro compounds include the mono- and dinitro paraffins such as nitromethane, nitroethane, 1-nitropropane, 2-nitropropane, 2-methyl-2-nitropropane, 2,2-dimethyl-1-nitropropane, 2,2-dinitropropane, 3,5-dinitro-3-methylhexane and 1,2-dinitroisobutylene. Aromatic nitro compounds which may be used as stabilizers are nitrobenzene, dinitrobenzene, nitrotoluene, dinitrotoluene, nitrocumene, dinitromesitylene and dinitrodurene. These nitro compounds provide effective stabilization of the polyol solutions when they are present in a concentration between about 0.5 and 5.0 weight percent of the solution.

The changes with time in viscosity and Gardner color are listed in Table I for various polyols and stabilizers. In addition to using different concentrations of the stabilizer, the solutions were stored at different temperature levels and their properties checked at several intervals of time.

TABLE I

*Changes in viscosity and color of polyol solutions during storage*

| Sample No. | Stabilizer, wt. percent | Storage | | Viscosity, cps. at 24° C. | Gardner color |
|---|---|---|---|---|---|
| | | Days | Temp. | | |
| 1 | None | 0 | 27° C | 1,135 | 5 |
| | | 30 | 27° C | 2,400 | 13 |
| | | 58 | 27° C | | 17 |
| | | 73 | 27° C | 5,800 | |
| 2 | 0.5% nitromethane | 0 | 27° C | 1,130 | 5 |
| | | 30 | 27° C | 1,020 | 6 |
| | | 58 | 27° C | | 6 |
| | | 73 | 27° C | 1,105 | |
| 3 | 1.0% nitromethane | 0 | 27° C | 1,100 | 5 |
| | | 30 | 27° C | 1,020 | 6 |
| | | 58 | 27° C | | 6 |
| | | 73 | 27° C | 1,105 | |
| 4 | 2.0% nitromethane | 0 | 27° C | 865 | 5 |
| | | 30 | 27° C | 960 | 5 |
| | | 58 | 27° C | | 6 |
| | | 73 | 27° C | 1,000 | |
| 5 | 3.0% nitromethane | 0 | 27° C | 760 | 5 |
| | | 30 | 27° C | 815 | 6 |
| | | 58 | 27° C | | 6 |
| | | 73 | 27° C | 980 | |
| 6 | None | 0 | 158° C | 1,500 | 5 |
| | | 5 | 158° C | 21,000 | 18+ |
| | | 8 | 158° C | 46,500 | 18+ |
| 7 | 1.0% nitromethane | 0 | 158° C | 1,070 | 5 |
| | | 5 | 158° C | 1,400 | 10 |
| | | 8 | 158° C | 1,880 | 11 |
| 8 | 3.0% nitromethane | 0 | 158° C | 840 | 5 |
| | | 5 | 158° C | 1,050 | 7 |
| | | 8 | 158° C | 1,180 | 10 |
| 9 | 2.0% 2-nitropropane | 0 | 158° C | 1,120 | 5 |
| | | 8 | 158° C | 1,170 | 12 |
| 10 | None | 0 | 140° F | 100 | 4.5 |
| | | 4 | 140° F | 685 | 18 |
| 11 | 1.6% nitromethane | 0 | 140° F | 100 | 4.5 |
| | | 4 | 140° F | 100 | 16 |
| 12 | 1.6% nitrotoluene | 0 | 140° F | 100 | 4.5 |
| | | 4 | 140° F | 100 | 16 |

Samples numbers 1–9 used a polyol blend containing 0.5 equivalent of N-(2-hydroxyethyl)-N,N',N'-tris(2-hydroxypropyl)ethylenediamine and 0.5 equivalent of an octafunctional polyol having a hydroxyl number of 530 and an equivalent weight of 105. Dissolved in the polyol blend was 20 weight percent of trichlorofluoromethane as a foaming agent and 1.2 weight percent of triethylenediamine as a catalyst. Samples numbers 10–12 contained a single polyol, N-(2-hydroxyethyl)-N,N',N'-tris(2-hydroxypropyl)ethylenediamine along with 20 weight percent of trichlorofluoromethane and 0.6 weight percent of triethylenediamine. The viscosities of Samples 1–9 are approximately ten times those of Samples 10–12 owing to the octafunctional polyols. Both the time-viscosity relationship and the ability of the organic nitrate to stabilize the solutions are comparable at the two viscosiy levels.

The viscosity and color of Samples 1, 6 and 10 which contained no stabilizer clearly illustrate the changes in the properties of the solution which occur with time as well as the effect of increased temperature. The viscosity and color of samples containing 0.5 weight percent or more of a nitro compound remain relatively unchanged throughout the period of the tests, clearly demonstrating the uniqueness of these stabilizers.

The improved color of the polyol solutions stabilized with nitro compounds was reflected in polyurethane foams prepared from the solutions. Foams were prepared with Samples 6 and 7 of Table I by mixing the polyol solution with a toluene diisocyanate solution containing 15 wegiht percent of tris-β-chloroethyl phosphate as a flame retardant and 0.5 weight percent of a polypropylene glycol having a molecular weight of about 4000 as a cell control agent. The two solutions were combined in proportions to provide about 1.1 isocyanate groups per hydroxyl group. The appearance of these foam samples is given in Table II.

TABLE II

*Effect of age and stabilizer on foam appearance*

| Sample No. | Stabilizer, weight percent | Storage, Days | Foam Appearance |
|---|---|---|---|
| 6 | None | 0 | White. |
|  |  | 5 | Cream colored. |
|  |  | 8 | Do. |
| 7 | Nitromethane, 1 | 0 | White. |
|  |  | 5 | Do. |
|  |  | 8 | Do. |

From the above it can be seen that polyurethane foams prepared from polyol solutions which are not freshly prepared and do not contain an organic nitro compound as a stabilizer are cream colored rather than the desired white.

Although these stabilizers are particularly suited for use with the amine polyols, they may be used to advantage with the non-amine polyols such as the glycols. A lower concentration of the stabilizer is effective with the non-amine polyols than with the amine polyols.

I claim:
1. A polyol solution for the preparation of a polyurethane foam by reaction with an organic diisocyanate wherein said polyol is N-(2-hydroxyethyl)-N,N',N'-tris-(2-hydroxypropyl)ethylenediamine and the solution contains a catalyst for said reaction and a foaming agent, said polyol solution also containing as a stabilizer from 0.5 to 5.0 weight percent of an organic nitro compound selected from the group consisting of mono- and dinitro-substituted alkyl, aryl and aralkyl hydrocarbons.

2. A polyol solution according to claim 1 wherein said organic nitro compound is a nitroparaffin.

3. A polyol solution according to claim 1 wherein said organic nitro compound is an aromatic nitro compound.

4. A polyol solution according to claim 1 wherein said organic nitro compound is nitromethane.

5. A polyol solution according to claim 1 wherein said organic nitro compound is 2-nitropropane.

6. A polyol solution according to claim 1 wherein said organic nitro compound is nitrotoluene.

7. A polyol solution according to claim 1 wherein said foaming agent is a halogenated methane compound.

8. A polyol solution according to claim 1 wherein said foaming agent is trichlorofluoromethane.

9. A polyol solution according to claim 1 wherein said catalyst is an amine.

10. A polyol solution according to claim 1 wherein said catalyst is an organometal compound.

11. A polyol solution according to claim 1 wherein said polyol is the tetrahydroxy adduct of aminoethyl ethanolamine and propylene oxide.

12. A polyol solution according to claim 1 wherein said solution is a mixture of the tetrahydroxy adduct of aminoethyl ethanolamine and propylene oxide with from 0.5 to 5.0 weight percent of nitromethane as a stabilizer therefor, together with a foaming agent and a polymerization catalyst.

References Cited by the Examiner

UNITED STATES PATENTS

| 2,868,844 | 1/1959 | Coffield et al. | 260—45.9 |
| 2,990,386 | 6/1961 | Roney | 260—32.4 |
| 3,067,150 | 12/1962 | Dombrow et al. | 260—2.5 |

FOREIGN PATENTS

| 1,189,712 | 3/1965 | Germany. |

LEON J. BERCOVITZ, *Primary Examiner.*

J. J. KLOCKO, *Assistant Examiner.*